United States Patent [19]

Endo et al.

[11] Patent Number: 4,998,164

[45] Date of Patent: Mar. 5, 1991

[54] SWING-DRIVEN SOLID-STATE COLOR IMAGE SENSOR

[75] Inventors: Yukio Endo; Nozomu Harada, both of Yokohama, Japan; Okio Yoshida, Wembley, England

[73] Assignee: Tokyo Shibaura Denki Kabushiki Kaisha, Kawasaki, Japan

[21] Appl. No.: 525,318

[22] Filed: May 21, 1990

Related U.S. Application Data

[63] Continuation of Ser. No. 222,383, Jul. 21, 1988, abandoned, which is a continuation of Ser. No. 917,251, Oct. 18, 1986, abandoned, which is a continuation-in-part of Ser. No. 591,482, Mar. 20, 1984, abandoned.

[30] Foreign Application Priority Data

Mar. 23, 1983 [JP] Japan .................. 68-48129

[51] Int. Cl.$^5$ .................. H04N 9/07; H04N 9/10
[52] U.S. Cl. .................. 358/44; 358/53; 358/229; 358/213.22
[58] Field of Search .................. 358/41, 42, 43, 44, 358/45, 53, 213.22, 229

[56] References Cited

U.S. PATENT DOCUMENTS

| | | | |
|---|---|---|---|
| 4,320,413 | 3/1982 | Takemura | 358/44 |
| 4,369,469 | 1/1983 | Endo et al. | 358/213.31 |
| 4,479,143 | 10/1984 | Watanabe et al. | 358/44 |
| 4,517,603 | 5/1985 | Epsztein et al. | 358/213 |
| 4,543,601 | 9/1985 | Harada et al. | 358/212 |
| 4,567,525 | 1/1986 | Endo et al. | 358/213.26 |
| 4,595,954 | 6/1986 | Endo et al. | 358/213.28 |
| 4,607,287 | 8/1986 | Endo et al. | 358/213 |
| 4,612,581 | 9/1986 | Endo et al. | 358/213 |
| 4,652,928 | 3/1987 | Endo et al. | 358/213.28 |
| 4,698,686 | 10/1987 | Endo et al. | 358/213.26 |

FOREIGN PATENT DOCUMENTS

| | | |
|---|---|---|
| 2849749 | 5/1980 | Fed. Rep. of Germany . |
| 3149567 | 6/1982 | Fed. Rep. of Germany . |
| 3049130 | 7/1982 | Fed. Rep. of Germany . |
| 44514 | 4/1977 | Japan .................. 358/43 |
| 58-28275 | 2/1983 | Japan . |
| 56581 | 4/1983 | Japan .................. 358/213 |
| 1516764 | 7/1978 | United Kingdom . |

OTHER PUBLICATIONS

Kenneth A. Hoagland, "Image-Shift Resolution Enhancement Techniques for CCD Imagers", *SID 82 Digest*, 1982, pp. 288-289.

Primary Examiner—James J. Groody
Assistant Examiner—Mark R. Powell
Attorney, Agent, or Firm—Oblon, Spivak, McClelland, Maier & Neustadt

[57] ABSTRACT

A color image sensing system includes a CCD image sensor with an optical color filter. A CCD driver is provided to electrically drive the image sensor, which is attached to a vibration table serving as a swing-driver for moving the image sensor along a horizontal direction such that each cell of the image sensor shifts, in a frame period including first and second field periods, between four different sampling positions substantially aligned in the horizontal direction. During each field period, each cell is positioned at two sampling positions, wherein a brightness signal component is produced at one sampling position and color signal components are produced at these sampling positions. The distance between two sampling positions at which the brightness signal components of the first and second field images are produced is set to be half the horizontal pitch of the cells of the image sensor. The remaining two sampling positions of the four sampling positions are apart from each other by one-and-half times the horizontal cell pitch. A color frame image is thus reproduced by electrically adding the first and second field images to increase the number of picture elements to more than the actual number of cells, thereby improving the horizontal image resolution of the frame image and minimizing the generation of color moire in the frame image. The swing-drive operation of the image sensor is repeated in synchronism with the frame period.

6 Claims, 10 Drawing Sheets

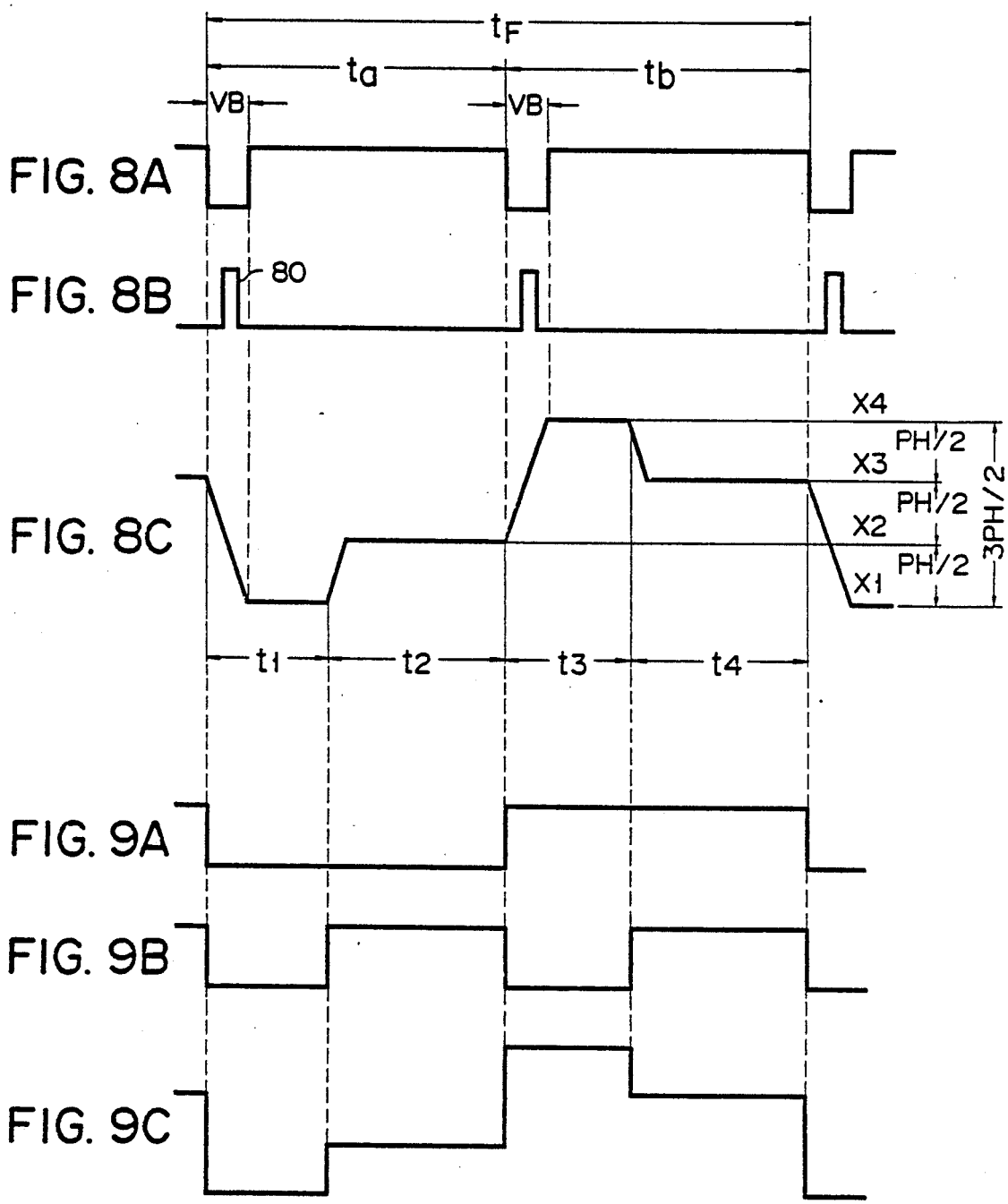

FIG. 10
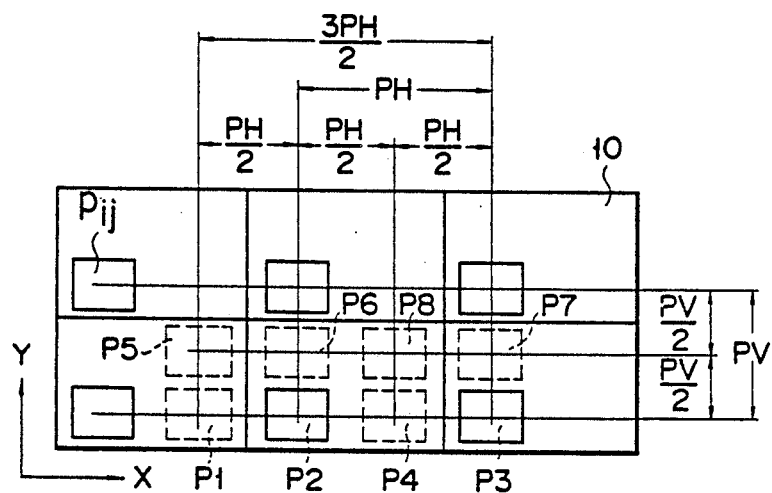
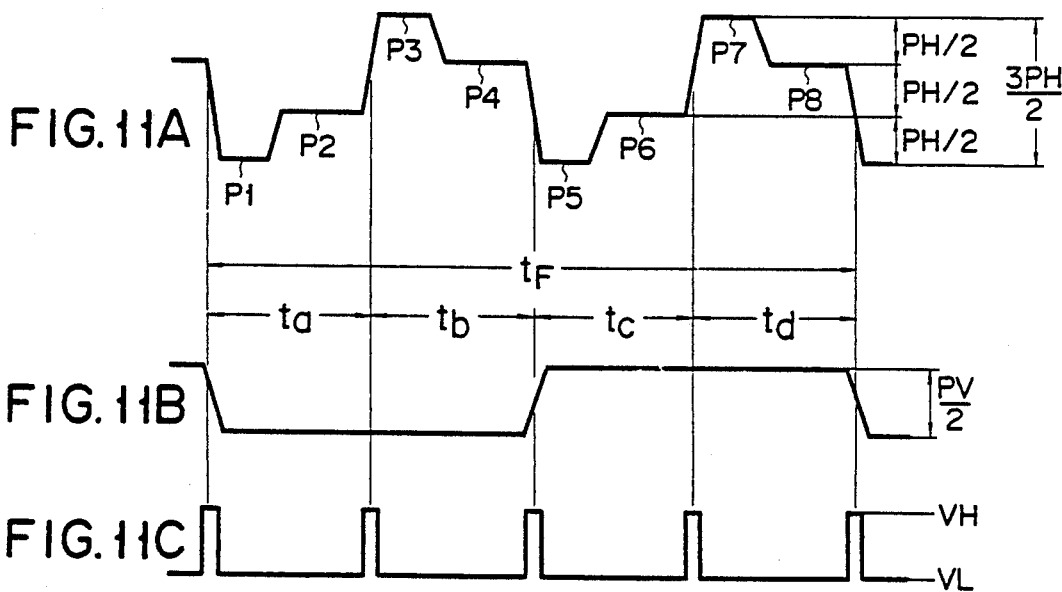

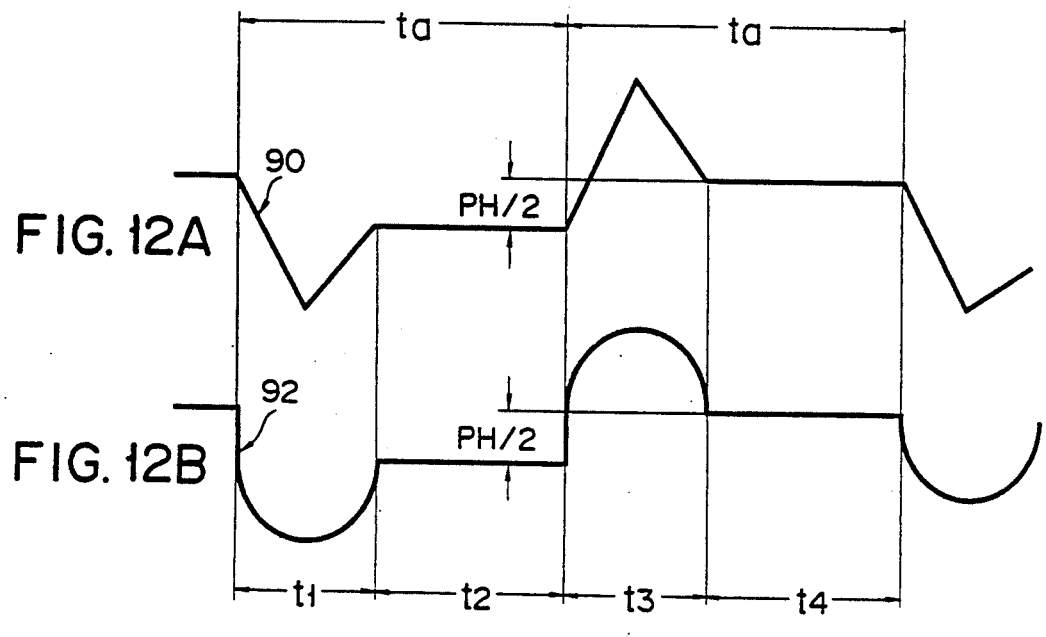
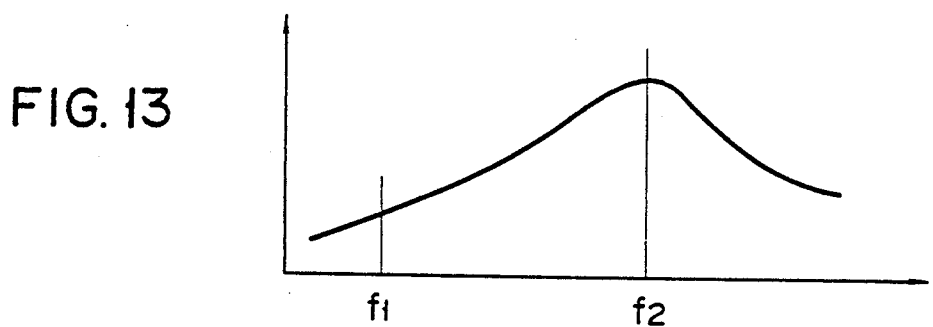
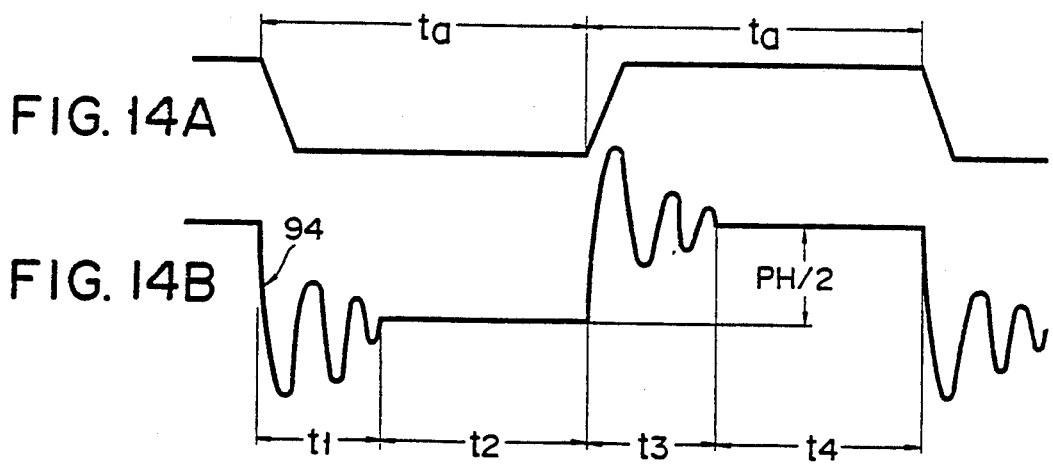

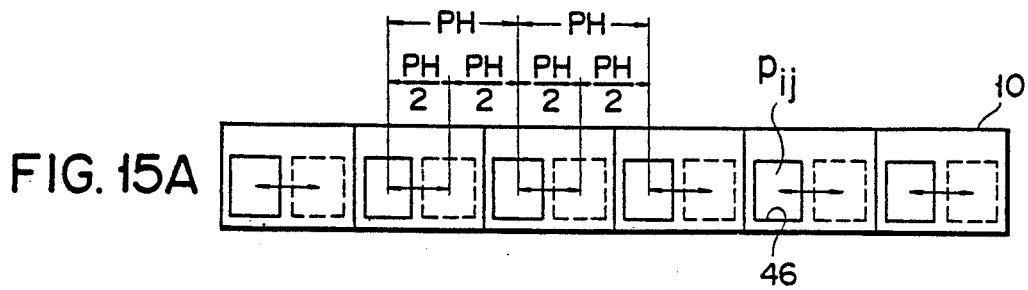
FIG. 15A
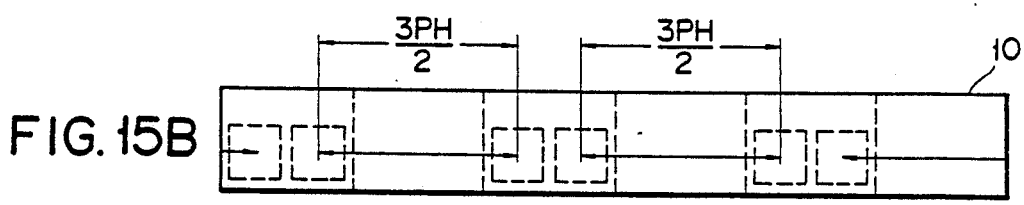
FIG. 15B
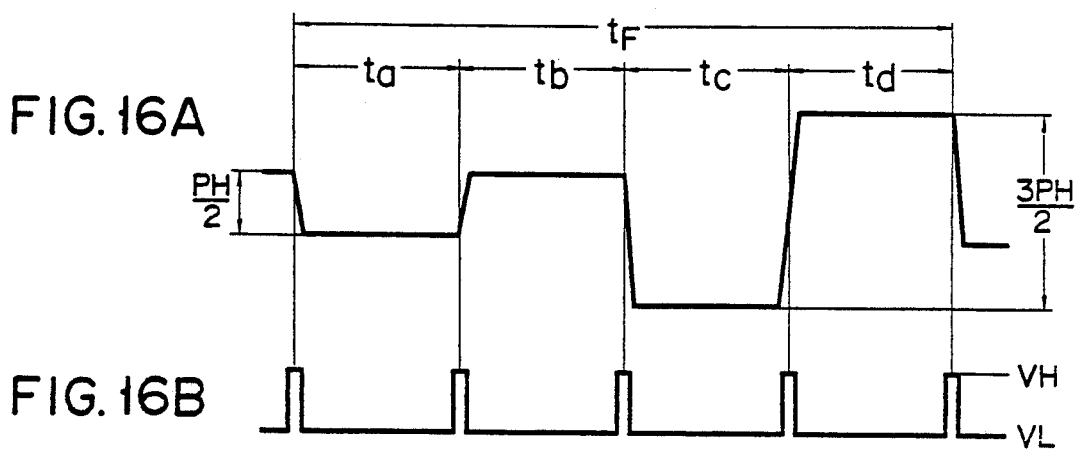
FIG. 16A
FIG. 16B

SWING-DRIVEN SOLID-STATE COLOR IMAGE SENSOR

This application is a Continuation of application Ser. No. 222,383, filed on July 21, 1988, which is a continuation of Ser. No. 917,251 filed on Oct. 8, 1986 which is a CIP of Ser. No. 591,482 filed on Mar. 20, 1984, all now abandoned.

BACKGROUND OF THE INVENTION

The present invention relates in general to a solid-state image sensing device and, more particularly, to a color CCD image sensor which is swing-driven to periodically shift position relative to incident image light.

In order to obtain color image signals using one solid-state image sensor such as the charge-coupled device (CCD), there has been a well-known technique of employing an assembly of optical mosaic patterned color filters which have a wavelength transmission characteristic suitable for CCD's twodimensional picture element arrangement. In the case of a color filter arrangement according to the frequency interleaving system suitable for CCD's field storage mode, for example, cyan filter components, whole transmission filter components and yellow filter components are alternately arranged in an appropriate manner. In the case where one frame image consists of two field images according to the NTSC system, for example, and when signal reading is suitably done from the color filter components in each of the fields, three primary color signals, that is, red (R), green (G) and blue (B) signals, which are necessary for a color signal process can be obtained by adding, and/or subtracting output image signals of the color filter components by means of one scanning line delay memory.

When the frequency band of G signal components is made wide to enhance the image resolution of the color CCD image sensor of this type, false signal (or moire, for example) are caused in the reproduced image which degrade its image quality. The overlap between the band for the G signal components and the band for the modulating signal components, which use CCD's sampling frequency fc (or fc/2) as their carrier frequency, increases, when the band for G signal components is made wider, thereby causing the undesirable moire phenomenon the (bad influence caused by the overlap of these signals is most prominent in the vicinity of fc/2). It is commonly considered that the CCD's sampling frequency fc may be set high to prevent the occurrence of moire. Setting the sampling frequency high, however, means an increase in the number of CCD's picture elements, and such an increase is difficult since it will lower productivity using current manufacturing facilities.

SUMMARY OF THE INVENTION

It is therefore an object of the present invention is to provide a new and improved color solid-state image sensing device capable of attaining a higher resolution and realizing a better image quality while keeping false signals such as moire at a minimum.

According to the present invention, there is provided a color solid-state image sensing device which comprises a solid-state image sensor. The image sensor generates signal charges representing a plurality of color field images for one color frame image, in response to the incoming light radiation. A color filter is attached to the photosensing face of the image sensor. A swing-driver section is provided for vibrating or swinging the image sensor under a specific swing mode which causes various vibrations. In this context the term "swing" and "swing driven" is used to mean not only simple reciprocation between any two points but also two-dimensional displacement including a step movement and a smooth movement. The solid-state image sensor includes a photosensitive section provided with at least one linear cell line consisting of a predetermined number of cells to receive the light radiation and generate and store charges which correspond to the light radiation, and at least one transferring section arranged adjacent to the at least one linear cell line and extending along this cell line to read out and transfer the charges stored in the sensing section. The swing-driver section generates a relative positional shift between the incident radiation and the solid-state image sensor. The relative positional shift is repeated every appropriate time period which is synchronized with one frame period. The cell line of the image sensor is thus shifted to different image pickup positions, relative to the incident radiation, to achieve image pickup at different time points in each field period of one frame period.

BRIEF DESCRIPTION OF THE DRAWINGS

The present invention will be best understood with reference to the accompanying drawings, in which:

FIGS. 8A to 8C are waveforms showing vibration modes under which the two-stage-swing image pickup is carried out by the first embodiment of FIG. 1 using the drive pulse generator of FIG. 7;

FIGS. 9A to 9C are waveforms showing signals generated in the main portion of the drive pulse generator of FIG. 7;

FIG. 10 is a plane view showing plural picture element regions for explaining the two-stage-swing image pickup modes of a second embodiment of a color image pickup apparatus or IT-CCD according to the present invention;

FIGS. 11A to 11C are waveforms showing vibration modes under which the swing image pickup is carried out by the second embodiment of FIG. 10;

FIGS. 12A and 12B are waveforms showing the swing image pickup modes of a further example of color image sensing system or IT-CCD according to the present invention;

FIG. 13 is a graph showing the frequency characteristic of bimorph piezoelectric element;

FIGS. 14A and 14B are waveforms showing vibration modes under which the swing image sensor is carried out by the embodiment shown in FIG. 1;

FIGS. 15A and 15B are plane views showing plural picture element regions intended to explain the swing image pickup mode of a still further example of color solid-state image sensor or IT-CCD according to the present invention; and FIGS. 16A and 16B are waveforms showing vibration modes under which the swing image pickup is carried out by the embodiment of FIG. 10.

DETAILED DESCRIPTION OF THE PREFERRED EMBODIMENTS

Figure 1:
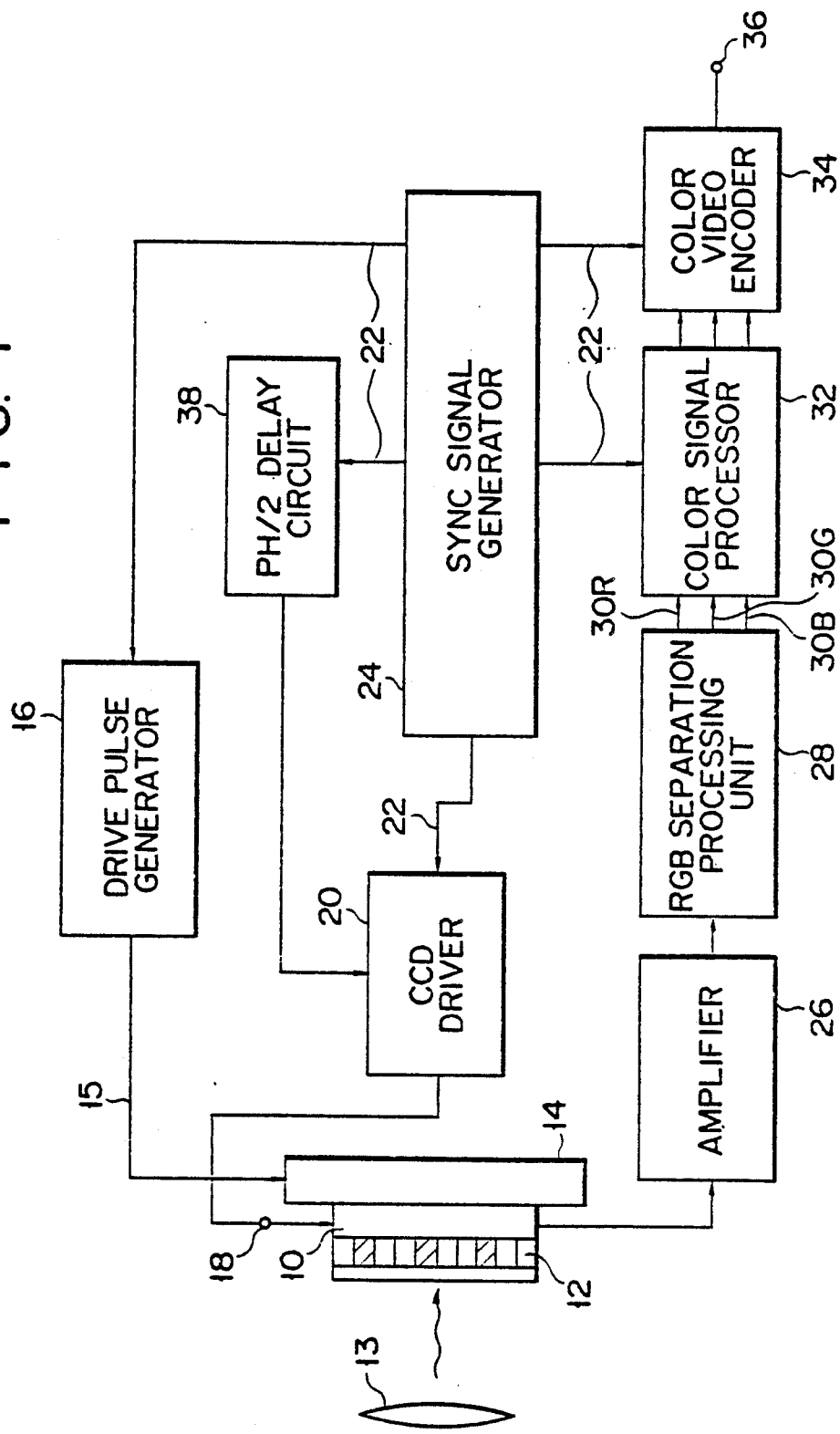
FIG. 1 is a block diagram showing the whole arrangement of a first example of color CCD image sensing system according to the present invention.
Figure 2:
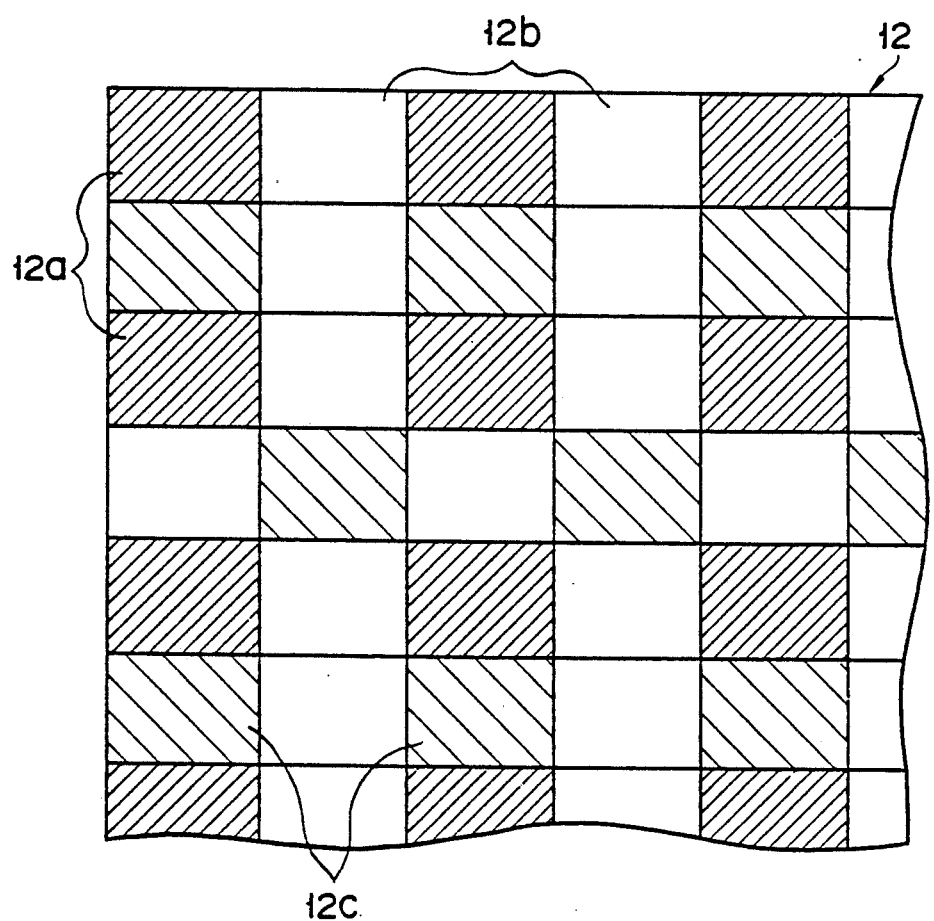
FIG. 2 is a plane view showing a color filter arranged on an interline-transfer charge-coupled device (IT-CCD) included in the image sensing system shown in FIG. 1.

FIG. 1 shows a first embodiment of the present invention in which a color solid-state image sensor is adapted to swing relative to the incident image light under a predetermined vibration mode. In FIG. 1, an area image sensor or interline transfer type charge-coupled device (which will be hereinafter referred to as IT-CCD) 10, for example, is provided with an optical color filter 12. As shown in FIG. 2, the color filter 12 comprises an arrangement of a mosaic pattern cyan filter components 12a, indicated by CY, which allow a mixed color of green (G) and blue (B) signals to transmit therethrough, whole transmission (or colorless) filter components 12b, indicated by W, and yellow filter components 12c, indicated by YE, which allow a mixed color of red (R) and green (G) signals to transmit therethrough. The IT-CCD 10 is fixed to a vibration table 14 at its backside opposite to its image pickup side which faces a lens 13. The vibration table 14 vibrates under a predetermined complicated vibration mode in response to the swing driving signal 15 from a drive pulse generator circuit 16. The IT-CCD 10 fixed to this vibration table 14 is also vibrated or swung under the vibration mode.

The IT-CCD 10 is electrically connected to a CCD driver 20 through a gate terminal 18. The CCD driver 20 serves to appropriately drive the CCD 10, in response to sync pulse signal 22 generated by a sync signal generator circuit 24. The sync pulse signal or timing signal 22 is also supplied to the drive pulse generator 16, which produces the drive signal 15 in response to the timing signal 22 and supplies it to the vibration table 14. The output terminal of the vibrating IT-CCD 10 is connected to an RGB separation processing unit 28, whose arrangement is well-known to those skilled in the field, through a video signal amplifier 26. The unit 28 performs an appropriate adding and subtracting process to separatingly extract the three primary color signals (i.e., R, G and B signals) 30R, 30G and 30B in response to the output signals of the CCD 10. These single color signals 30 are successively applied to a color signal processor circuit 32 and a color encoder 34 which become operative in response to the timing signal 22 of the sync signal generator 24, and outputted as NTSC video signal through an output terminal 36. It should be noted that a delay circuit 38 functions to delay the timing of horizontal read-out of the CCD 10 by PH/2 (PH: horizontal picture element pitch) in a B field of A and B fields contained in one frame according to the NTSC system.

Figure 3:
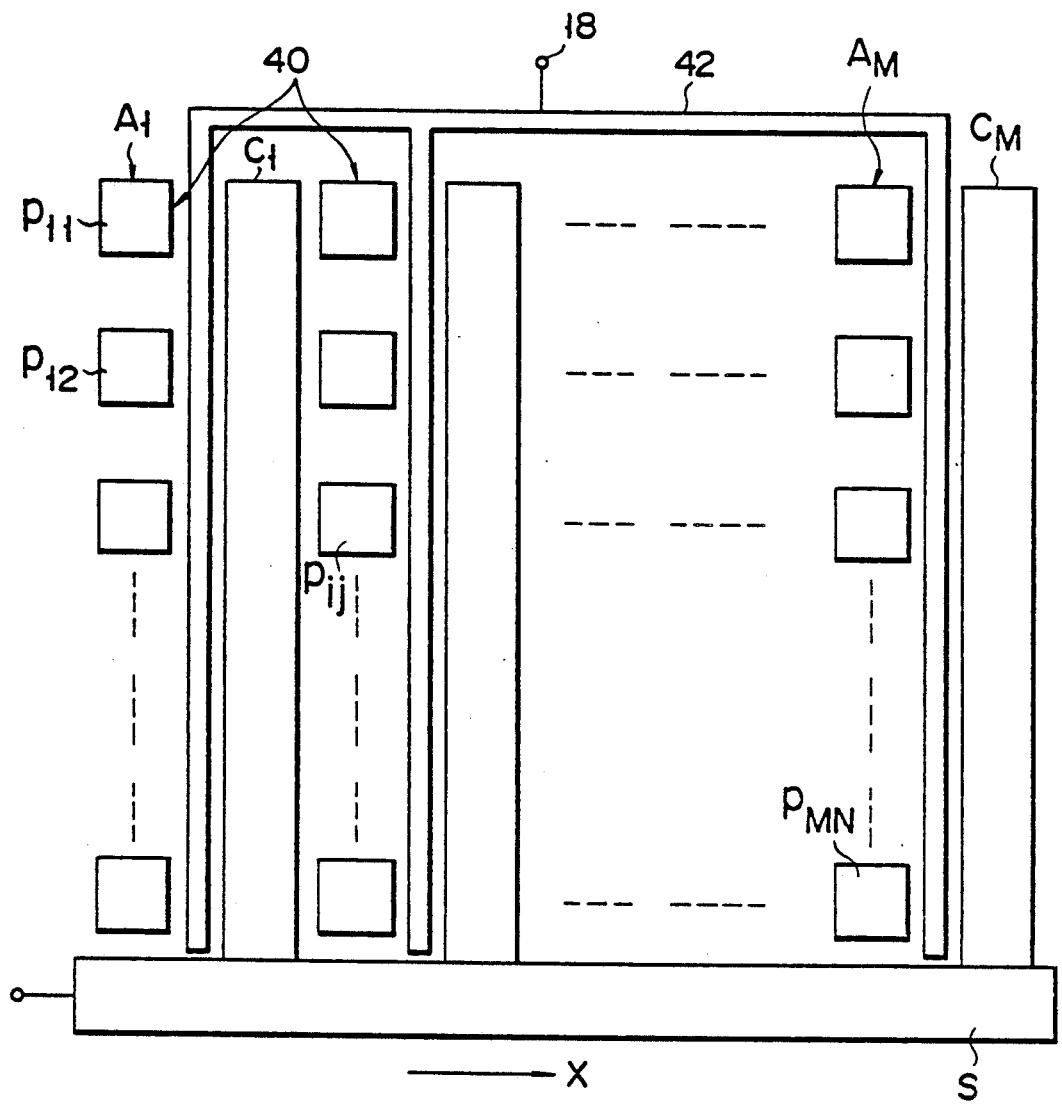
FIG. 3 shows a plane arrangement of an image sensing region of the IT-CCD shown in FIG. 1.

As shown in FIG. 3, the IT-CCD 10 has a photosensitive section 40 consisting of photosensitive elements or photodiodes $p_{11}, p_{12}, \ldots, p_{ij}, \ldots, p_{MN}$ in a matrix with dimensions of N by M (N=500 and M=400, for example). These photodiodes p are arranged in a matrix on a CCD substrate (not shown) and correspond accurately to the filter components 12a, 12b and 12c of the light filter body 12 shown in FIG. 2. M units of vertical CCDs $C_1, \ldots, C_M$ are arranged adjacent and opposite to M lines of photodiodes $A_1, \ldots, A_M$. These vertical CCDs $C_1, \ldots, C_M$ are connected to a horizontal CCD shift register S at their final transferring stages. A field shift gate (which will be hereinafter referred to as FSG) 42 is formed to have gate portions each extending between the vertical photodiode or picture element lines $A_1, \ldots, A_M$ and the vertical CCDs $C_1, \ldots, C_M$. When a pulse voltage signal (or gate control signal) is supplied from the CCD driver 20 of FIG. 1 to the FSG 42 through a gate terminal 18, signal charges stored in the photodiodes p due to incident light radiation are transferred to the vertical CCDs $C_1, \ldots, C_M$. The signal charges transferred to the CCDs $C_1, \ldots, C_M$ are further successively transferred to the horizontal CCD shift register S at every stage. Output signals of the IT-CCD 10 are supplied to the RGB separation processing unit 28 through the amplifier 26, and color NTSC video signals are then obtained according to the well-known method including the RGB separation process.

Figure 4:
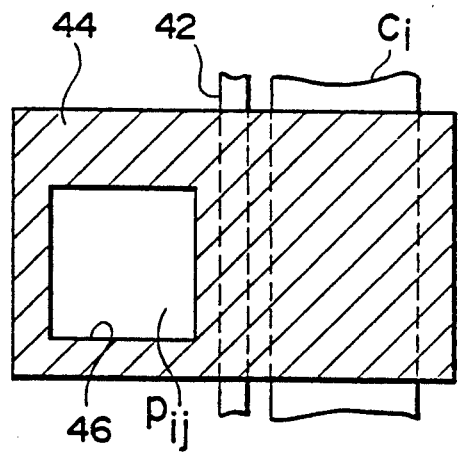
FIG. 4 shows an arrangement of that image sensing region of FIG. 3 which corresponds to one picture element.

FIG. 4 is a plane view showing in an enlarged scale that image pickup area which corresponds to one picture element or cell in the photosensitive section 40 of the IT-CCD 10 of FIG. 3. In FIG. 4, a portion 44 of the image pickup area which is shaded by oblique lines denotes an aluminum (Al) electrode which shields incident light. The Al electrode 44 has an opening 46 and the photodiode $P_{ij}$ which corresponds to a single imagesensing cell is located under the opening 46. The vertical CCD $C_i$ and the FSG 42 run under the Al electrode 44 and serve therefore as non-photosensitive areas because they are shielded by the Al electrode 44. The Al electrode 44 also separates the adjacent photodiodes optically from each other.

The first embodiment of the present invention is applied to a color image pickup according to the NTSC television system. Therefore, the IT-CCD 10 is swing-driven horizontally under a specific vibration mode, which will be described below, taking one frame period $t_F$ (which consists of two field period $t_a$ and $t_b$) in the color image pickup operation as one cycle. The swing image pickup mode of the IT-CCD 10 will be described in detail referring to FIG. 5.

Figure 5A:
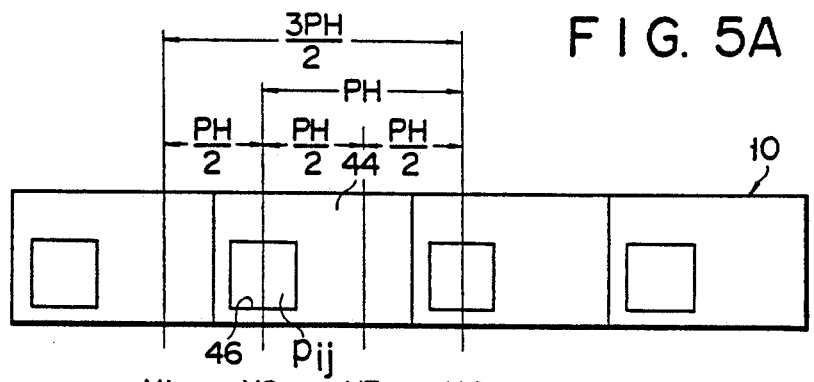
FIG. 5A is a plane view showing plural picture element regions for explaining the two-stage-swing image pickup mode attained by the IT-CCD of FIG. 1.
Figure 5B:
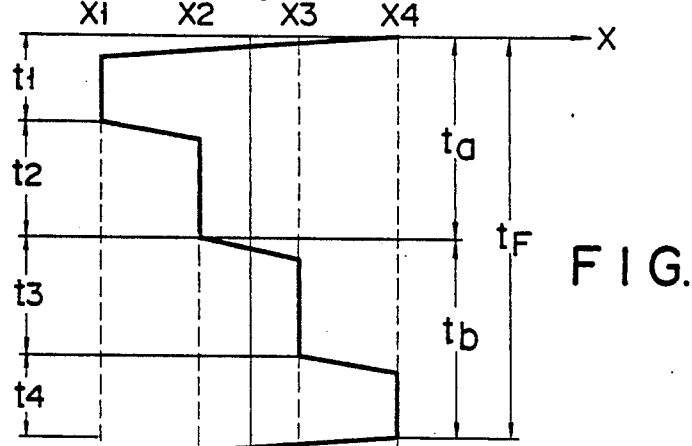
FIG. 5B is a graph showing a vibration waveform of the IT-CCD corresponding to the picture element region of FIG. 5A.
Figure 5C:
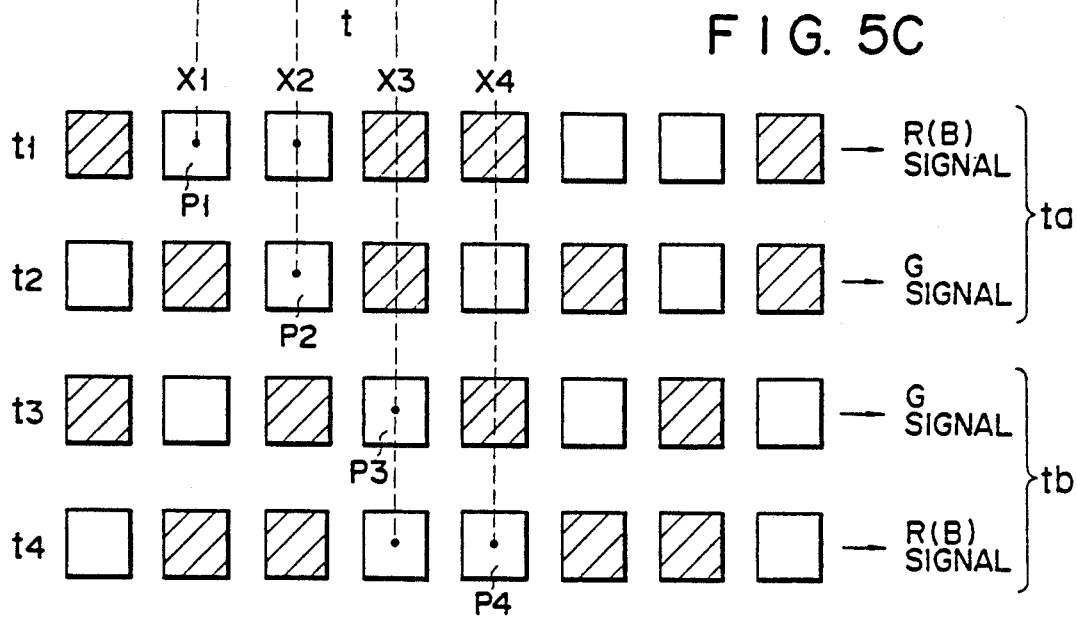
FIG. 5C shows, as a model, a positional shift of picture elements of the IT-CCD on the basis of time, which IT-CCD performs the two-stage-swing image pickup according to the vibration waveform shown in FIG. 5B.

In order to explain the swing mode of the IT-CCD 10, FIG. 5A shows, as a model, CCD's plural cell image pickup areas in which one cell areas such as shown in FIG. 4 are arranged in the horizontal direction. The IT-CCD 10 is position-shifted or swing-driven relative to the incident light by the vibrating table 14 in such a way that each cell $P_{ij}$ of the IT-CCD 10 under the opening 40 is successively shifted to four different positions in the horizontal direction (or X direction) within one frame period $t_F$ which consists of A and B field periods $t_a$ and $t_b$. FIG. 5B is a graph showing a vibration waveform plotted to show how the position of one cell $P_{ij}$ of the IT-CCD 10 changes in the lapse of time within one frame period $t_F$. As is apparent from FIG. 5B, the cell $P_{ij}$ positionally shifts or two-stage-swings in step-like manner to four different positions X1 to X4 in the horizontal direction within four periods t1 to t4 which are provided by dividing one frame period $t_F$. The first and second periods t1 and t2 correspond to the former and latter halves of the A field period $t_a$, respectively, while the third and fourth periods t3 and t4 correspond to the former and latter halves of the B field period $t_b$, respectively. If each of the transient period lengths ranging from t1 to t2, from t2 to t3, and from t3 to t4 is shorter enough than one frame period $t_F$ in a period during which the center of the opening 46 of the picture element $P_{ij}$ is moving, in other words, in the vibration waveform of FIG. 5B, it can be thought that the picture element $P_{ij}$ stops successively at positions X1 and X2 in the A field and at positions X3 and X4 in the B field. As shown in FIG. 5C, therefore, the number of space sampling areas in the horizontal direction and during one color imaging frame period $t_F$ of the IT-CCD 10 becomes four, as designated by P1 to P4.

FIG. 5C is a model diagram showing the position of picture elements (or pixels) of color signal components (R, G and B signals) obtained from the CCD image sensor 10, which is swing-driven in the vibration mode shown in FIG. 5B. That is, FIG. 5C equivalently shows how, based on the CCD output of the swing-driven CCD having the color filter shown in FIG. 2, each color signal component filtered by the RGB separation processing circuit 28 (See FIG. 1) generates pixel positions with respect to the first to fourth periods t1 to t4 of the swing-driven CCD 10. The sampling positions X1 to X4 are illustrated in FIG. 5C so as to correspond to those shown in FIG. 5B. In FIG. 5C, blank squares represent effective pixels for the individual color signal components, and the slash-lined squares represent ineffective pixels. As should be understood from FIGS. 5B and 5C, a brightness signal (i.e., G signal), which mainly determines the resolution of a reproduced image, generates the effective pixel P2, located at position X2, in the period t2, and generates the effective pixel P3, located at position X3 in the period t3. The distance between the sampling positions X2 and X3 is equal, as explained above, to a half (PH/2) of the actual horizontal cell pitch (PH) of CCD 10, so that the pixel of the G signal component is displaced between two different sampling positions X2 and X3 in a frame period $t_F$. This contributes to doubling the horizontal resolution of a reproduced image (to be explained in more detail later). The R signal component generates the effective pixels respectively located at the sampling positions X1 and X2, in the periods t1 and t2 (i.e., in the A field $t_a$), respectively, and generates the effective pixels, in the periods t3 and t4 (i.e., in the B field $t_b$), respectively (these effective pixels are respectively located at the sampling positions X3 and X4). (The B signal component operates in the same manner as the R signal component and should be considered to produce the same effects in the following discussion. The distance between the sampling positions X1 and X4 (or between the sampling positions P1 and P4') equals 1.5 times (3PH/2) the actual horizontal cell pitch (PH) of the CCD 10. The aperture ratio of the pixel for the R signal component in each field period is increased as indicated by two effective pixel regions in FIG. 5C. The pixel aperture for the R signal component located during the field period $t_a$ is opposite to that located during the field period $t_b$ with respect to the vibration center (corresponding to a middle point between the sampling positions X2 and X3 shown in FIG. 5B) thus contributing to the prevention of color moire phenomenon of a reproduced image as described in detail later.

As the above-explained two-step-swing driven image sensing is performed in synchronism with a single frame period $t_F$, each cell $P_{ij}$ is sequentially shifted between the four sampling positions X1 to X4 in the horizontal direction of CCD 10. Based on the CCD output of the swing-driven CCD 10, the R signal components are extracted by the color separation circuit 28, during the A field period $t_a$ of one frame period $t_F$ under image pickup mode, while the G signal components, (i.e., brightness signal components) are obtained during the latter half period t2 of the A field period $t_a$, thus providing an A field color image. In the subsequent step, the G signal components are obtained during the first half period t3 of the B field period $t_b$, and the R signal component are obtained during the B field period $t_b$ by the color separation circuit 28, thus providing a B field color image.

Figure 6:
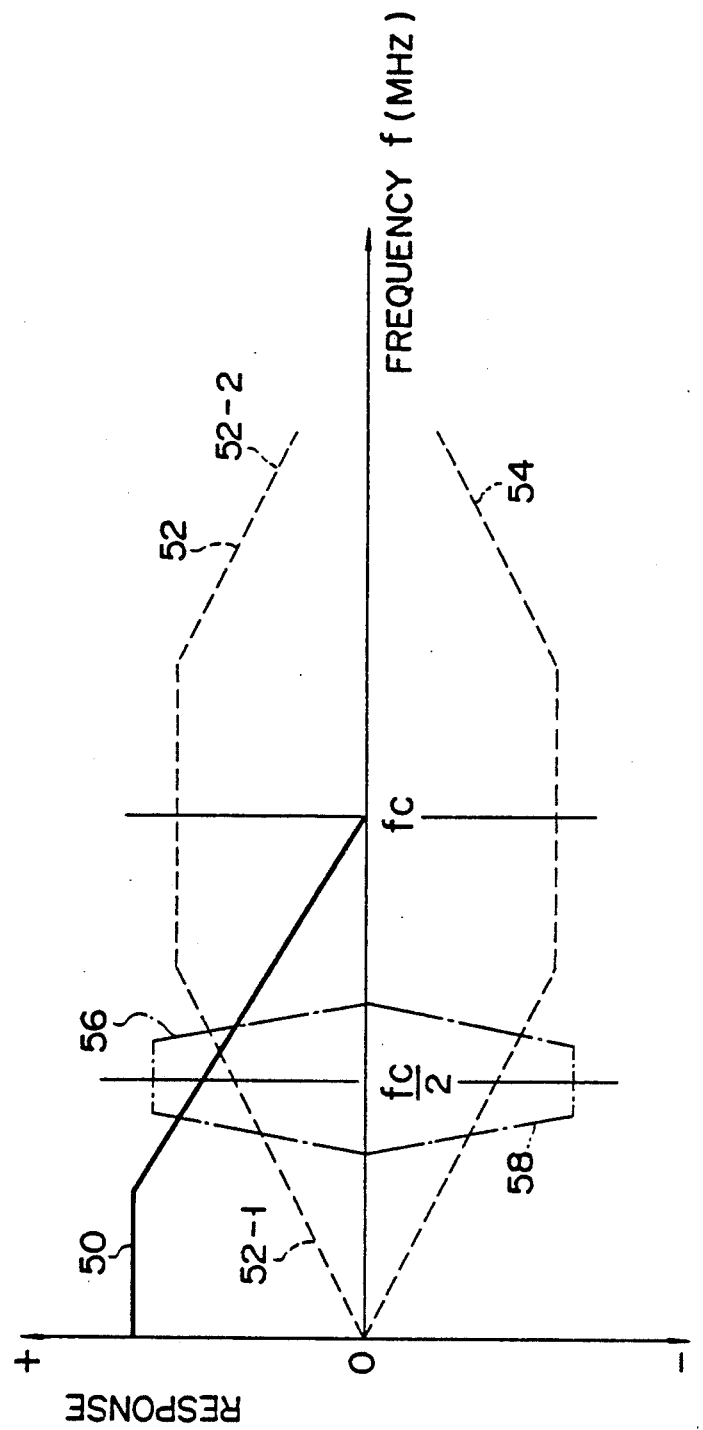
FIG. 6 is a graph showing a frequency spectrum of image pickup signals applied from the IT-CCD.

The A and B field image signals are spatially shifted on a reproduced image along the horizontal direction of an image to be picked up, corrected to coincide with the actual sampling points, and displayed on a TV screen of an image display unit (not shown). The horizontal resolution of the image thus displayed can be enhanced substantially by a factor of two, and its image quality can be made better because false signals such as color moire are reduced to minimum. The reasons for this will be described below in detail in reference to FIG. 6.

The fact that the resolution of the reproduced color pickup image is determined by that of the G signal components is well-known to those skilled in the field. In the case of the above-described embodiment, the G signal in the A field is read out during the period t2 in FIG. 5B and the G signal in the B field during the period t3. More specifically, the G signal components are obtained from two different space sampling points because the cell opening 46 is placed at two different image pickup positions X2 and X3 during the periods t2 and t3 of the A and B field periods. The distance between the image pickup positions X2 and X3 is equal to a half (PH/2) of the picture element pitch PH of the IT-CCD 10. When only the G signal is taken into consideration, therefore, the IT-CCD 10 could be considered to Vibrate between the A and B fields at an amplitude which corresponds to ½ of the horizontal picture element pitch PH. As compared with the conventional CCD color image pickup having nothing to do with the swing imaging technique, the horizontal resolution of the reproduced color image gained by the embodiment of the present invention is enhanced by two times. The frequency characteristic of the G signals at this time is shown by a solid line 50 in the graph of FIG. 6. According to the frequency spectrum, modulating components 52 and 54 whose carrier is the sampling frequency fc of the G signals are obtained in addition to the G signal 50. One modulating component 52 (on the pulse side) has two side bands 52-1 and 52-2 on the upper and lower sides of the frequency fc, and one side band 52-1 overlaps the frequency band of the G signal 50. Conventionally, false signals such as color moire are caused because of this frequency overlap between the G signal and the modulating component. According to the present invention, however, a negative modulating component 54 having a phase opposite to that of the positive modulating component 52 is present. When the G signals read out of the A and B fields are respectively superposed upon each other on a reproduced one frame image, the positive modulating component 52 is compensated by the negative modulating component 54. The modulating components 52 and 54 thus vanish substantially, to thereby eliminate "the frequency overlap" which is a cause of the moire phenomenon.

When the R and B signals are taken into consideration in the case of the IT-CCD 10 provided with the filter 12 of FIG. 2, the R signal of the A field is read out during the periods t1 and t2 of FIG. 5B and the R (or B) signal of the B field during the periods t3 and t4. The cell opening 40 is placed at the image pickup positions X1 and X4 for the periods t1 and t4 of one frame, and the distance between these positions X1 and X4 is equal to 3/2 (or 3PH/2) times the picture element pitch PH of the IT-CCD 10. When consideration is paid to the R signal, therefore, the CCD 10 can be considered to vibrate between the A and B fields at an amplitude which corresponds to 3/2 of the horizontal picture element pitch PH. As shown by dash-and-dot lines 56 and 58 in FIG. 6, modulating components whose carrier is a half (fc/2) of the sampling frequency fc are contained in the frequency characteristic of signals thus obtained. However, these modulating components 56 and 58 are opposite to each other in phase, and counterbalance each other when the A and B field signals are added to gain one frame image. "The overlap of frequencies" which is a cause of moire can be therefore eliminated for the same reason as already described above. According to the first embodiment of the present invention, the modulating components, which are caused under color swing imaging mode taking the frequency fc or fc/2 as their carrier, can be effectively cancelled at the time of forming one frame image, as described above. Therefore, the frequency overlap between the R signal and the G signal of the image pickup signals can be effectively reduced to thereby enable the occurrence of false signals such as moire to be kept at a minimum. Better pickup image as well as high resolution can be thus attained. It should be noted that the vibration amplitude between the periods t1 and t4 needed to reduce color moire has been selected to be 3/2 of the horizontal picture element pitch PH of the CCD 10 in the case of the first embodiment. This may cause a reduction of the resolution for the G signal. However, this matter is so trifling that it can be solved completely in the course of designing the above-described embodiment. Namely, it can be easily solved when the length between the periods t1 and t4 is designed shorter enough than that between the periods t2 and t3. According to tests conducted, it has been found preferable that t1 (=t4) and t2 (=t3) are set in a ratio of about 3 to 2.

Figure 7:
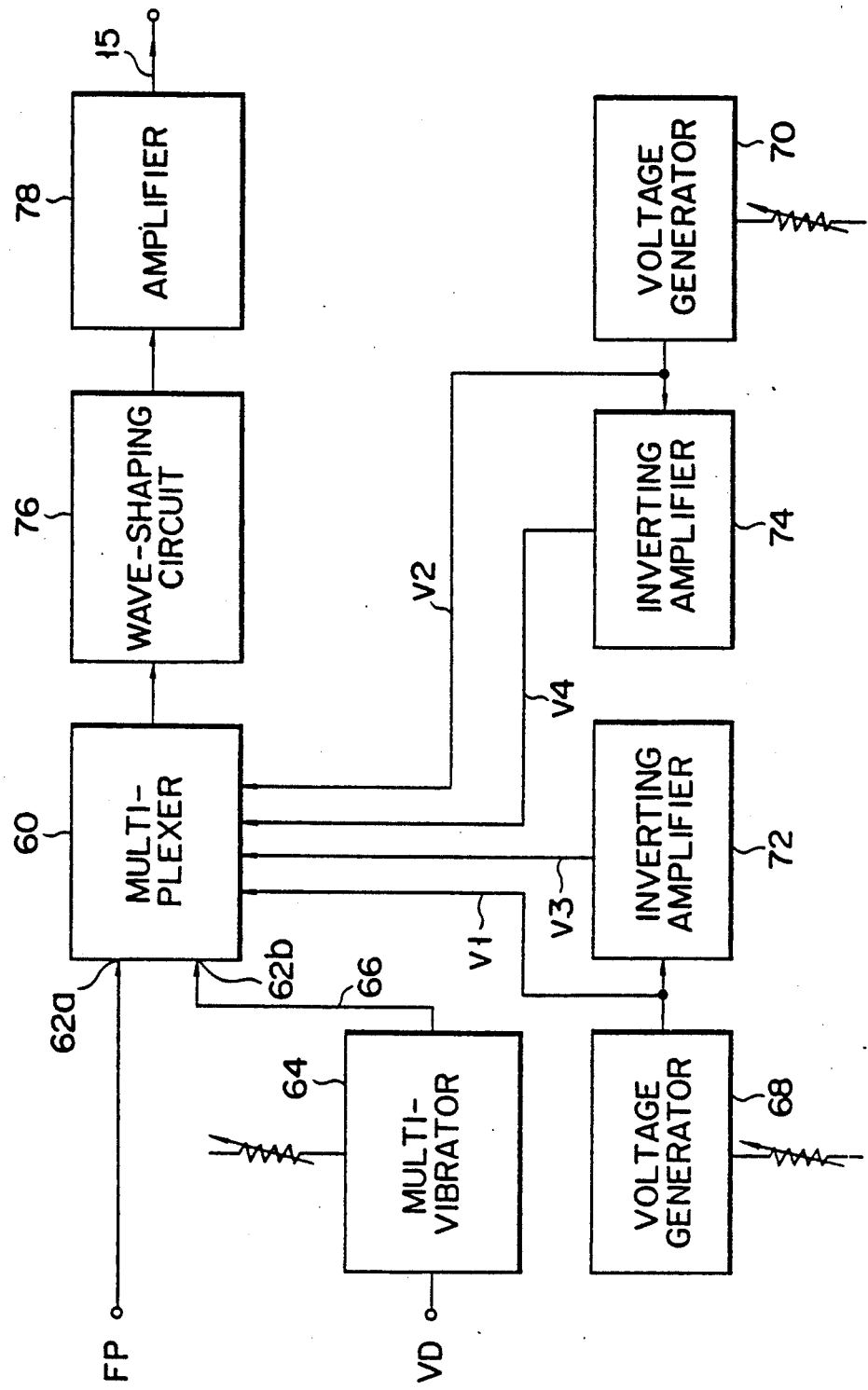
FIG. 7 is a block diagram showing a first embodiment of the drive pulse generator of FIG. 1.

FIG. 7 shows a concrete circuit arrangement of the drive pulse generator 16 employed in the first embodiment or two-stage swing image sensing system of FIG. 1. In FIG. 7, an analog multiplexer 60 has two control inputs 62a and 62b. A field pulse signal FP which has a low and high level in the A and B fields, respectively, of one frame image pickup period is supplied to the first control input terminal 62a. A monostable multivibrator 64 receives vertical sync pulse signal VD and produces signal 66, which designates the ratio of lengths between the periods t1 and t4, responsive to the signal VD. The signal 66 is supplied to the second input terminal 62b of the multiplexer 60. Two voltage generators 68 and 70 are connected directly to the multiplexer 60 and also indirectly thereto via two inversion amplifiers 72 and 74. The multiplexer 60 thus receives through its analog input terminals DC voltages v1 and v2 applied from the voltage generators 68 and 70, and DC voltages v3 and v4 applied from the inversion amplifiers 72 and 74. Therefore, the multiplexer 60 supplies a voltage signal, which has four different voltage levels v1, v2, v3 and v4 corresponding to the position shift periods t1 through t4, to the vibration table 14 of FIG. 1 via a wave-shaping circuit 76 and an output stage current amplifier 78 which serve to remove unnecessary high frequency signal components from the voltage signal. The voltage signal is supplied as the swing drive signal 15 to the vibration table 14. The variable resistors connected to the voltage generator 68 and 70 determine the voltages V1 and V2. The voltages V3 and V4 are produced by inverting the voltages V1 and V2.

FIGS. 8A to 8C are waveform diagrams showing the relationship between sync pulses and the swinging operation of the CCD 10 in a case where image signals are obtained uses the first embodiment in which the drive pulse generator 16 of FIG. 7 has been employed. FIG. 8A is a waveform diagram showing vertical blanking periods VB, and FIG. 8B is a waveform diagram of the field shift pulse signal. This field shift pulse signal serves to transfer the signal charge stored in each picture element of the CCD 10 to the vertical read-out CCD $C_i$. Each of the field shift pulses 80 is set to be contained in each of the vertical blanking periods VB. The color CCD 10 swings therefore are synchronized with the field shift pulses 80 and follow a vibration waveform shown in FIG. 8C. It should be noted, however, that the swing waveform of the color CCD 10 in the image sensing system of FIG. 1 in which the drive pulse generator 16 shown in FIG. 7 has been employed is different from the swing waveform of FIG. 8B in the following point. Namely, vibration periods corresponding to the periods t3 and t4 are reversed in the B field period $t_b$ (positional shifts of the CCD 10 in one frame are not carried out in the order of X1 → X2 → X3 → X4, but in the order of X1 → X2 → X4 → X3 in this case). The change of this vibration mode is not essential but is done only to be suitable for designing when the two-stage swing mode is realized. As is apparent from FIG. 8C, the shift of the CCD 10 to the position X1 when the period changes from t4 to t1, and the shift of the CCD 10 from the position X2 to X4 when the period changes from t2 to t3 are carried out in the blanking periods VB. Namely, these shifts of the CCD are carried out at the same time when the signal charge is transferred from the picture element area 40 to the vertical CCD section $C_i$. FIGS. 9A to 9C show waveforms of signals generated in the main portion of the drive pulse generator of FIG. 7, in which FIG. 9A is a waveform diagram showing the field pulse signal supplied directly to the multiplexer 60, FIG. 9B a waveform diagram showing an output signal generated from the monostable multivibrator 64, and FIG. 9C a waveform diagram showing the drive pulse signal 15 obtained responsive to the output signal of the multiplexer 60. The signal 15 in FIG. 9C is formed in such a manner that the DC voltages v1, v2, v3 and v4 supplied from the multiplexer 60 are allotted corresponding to the vibration unit periods t1 to t4, which are determined by the output signal or control pulse signal 66 of the monostable multivibrator 64. This drive pulse signal 15 has four-level voltage values during one frame period $t_F$, following the CCD's swing mode waveform in FIG. 8C.

Image pickup signals obtained from the CCD 10 which two-stage-swings like this are supplied to the signal processor 32 through the amplifier 26 and RGB separation processing unit 28, as already described above. For the purpose of shifting image pickup output signals in phase according to space sampling points adopted by the twostage image pickup of the CCD 10, the timing of clock pulses supplied to the horizontal CCD shift register S in the color CCD 10 is shifted ½ clock in signal phase only in the B field $t_b$, as compared with the timing thereof in the A field $t_a$. There can be thus obtained B field image signal which has been shifted ½ picture element pitch in phase only in the B field period $t_b$, as compared with A field image signal. Thereafter, the A and B field image signals are added according to the well-known manner to obtain a frame image signal (or NTSC image). The pickup image whose resolution in the horizontal direction has been enhanced by a factor of two and whose moire has been reduced to a minimum can be thus obtained.

A second embodiment of the present invention will be described referring to FIGS. 10 and 11. According to the second embodiment, one frame image pickup period $t_F$ consists of four field periods $t_a$, $t_b$, $t_c$ and $t_d$, and the color CCD 10 is vibrated both in the horizontal and vertical directions. FIG. 10 shows, as a model, a plurality of cell areas of CCD for the purpose of explaining swing modes in the horizontal and vertical directions. In the horizontal direction (or X direction) shown in FIG. 10, the CCD 10 carries out the above-described two-stage swing image pickup, taking two fields (A and B fields $t_a$, $t_b$ or C and D fields $t_c$, $t_d$) in one frame period $t_F$ as one unit cycle. As shown in FIG. 11A, the CCD 10 performs the two-stage swing image pickup to take four different positions (P1, P2, P3 and P4) in the A and B field periods $t_a$ and $t_b$, under the condition that brightness signal components are produced at the sampling positions P2 and P4, the distance between which is PH/2 and that color signal components are produced at the positions P1 and P3 which are apart from each other by 3PH/2. The CCD 10 also swings similarly in the X direction even for the third and fourth field periods $t_c$ and $t_d$ in one frame period $t_F$. In the vertical direction (or direction Y), the CCD 10 vibrates at an amplitude half the vertical direction pitch PV of cell, taking two fields (A and B fields $t_a$, $t_b$ or C and D fields $t_c$, $t_d$) as one unit cycle. When the two-stage swing in the direction X and the vibration in the Y direction are carried out at the same time, synchronizing with each other, the CCD 10 is moved to successively take positions P1 to P8 shown in FIG. 10 during one frame period $t_F$. FIG. 11C is a waveform diagram showing the field shift pulse signal applied to the CCD which performs this swing image pickup. According to the second embodiment, incident light image is successively sampled at the space sampling points P1, P2, ..., P8 shown in FIG. 10, thereby eliminating ineffective area from the whole photosensitive area of image pickup element chips. The enhancement of the resolution in the horizontal and vertical directions and the reduction of color moire can be thus achieved.

Although the present invention has been shown and described with respect to particular embodiments, various changes and modifications which are obvious to a person skilled in the art to which the present invention pertains are deemed to lie within the spirit and scope of the present invention.

A variation of the swing mode waveforms attained by the first embodiment is shown in FIG. 12. A vibration waveform 90 shown in FIG. 12A represents that a vibration for the A and B field periods t1 and t3 which reduces color moire forms a triangular wave. Using this vibration waveform 90, the sensitivity distribution in each picture element obtained in the A and B fields becomes uniform, having no ineffective area, so that a reproduced image, further reduced in color moire and higher in resolution, can be obtained, as compared with the reproduced image attained under the vibration modes which have been described with reference to the previous embodiments. The vibration is carried out at an amplitude of PH/2 for periods t2 and t4 during which the G signal is obtained, as in the case of the above-described embodiments. A vibration waveform 92 shown in FIG. 12B represents that a vibration for the periods t1 and t3 which reduces color moire forms a sine wave. This also makes it possible for a reproduced image, reduced in color moire and high in resolution, to be obtained, similar to using the vibration waveform 90.

There will be described a further embodiment of the present invention capable of making simpler the drive pulses applied to image pickup element chips. When a bimorph piezoelectric element made of ceramic, for example, is used as the vibration table 14 in FIG. 1, the amount of vibration of the piezoelectric element varies with a change in frequency of vibration as shown in FIG. 13, and has a resonance point f2. In the case where the present invention is applied to the television standard system (or NTSC system), the vibration frequency f1 is about 30 Hz. The resonance point f2 is usually larger than 500 Hz although it depends upon the construction of the bimorph piezoelectric element. When simple drive pulses synchronous with field pulses, as shown in FIG. 14, are applied using this bimorph piezoelectric element, a vibration waveform 94 shown in FIG. 14B is obtained. Namely, ringing due to the resonance point f2 occurs at the rising and falling times of the drive pulses. When this ringing amount is controlled by these rising and falling times of the drive pulses to get a point where color moire is reduced to a minimum, the same effects as those attained by the already-described embodiments can also be achieved.

Although the present invention has been described referring to the cases where it is applied to the television standard system, still further reduction of color moire and higher resolution will be made possible in the case of an electronic camera, which uses no silver-salt film, and a system such as an optical character recognition system (known as OCR) for example, because one frame is not limited to two fields. FIGS. 15 and 16 are intended to describe such an embodiment. One frame consists of four fields A, B, C and D, the G signal containing the brightness signal is obtained in the A and B fields, while the color signal is obtained in the C and D fields. More specifically, as shown in FIGS. 16A and 16B, a vibration of PH/2 is carried out, synchronized with the timing at which field shift pulse changes from low level $V_L$ to high level $V_H$ in the A and B fields. Since the picture element openings 46 on the image pickup element chip substrate 10 are thus shifted to the positions shown by broken lines in the B field, as shown in FIG. 16A, the number of sampling points is doubled to thereby enhance the resolution for the G signal. On the other hand, vibration is carried out at an amplitude of 3PH/2 in the C and D fields, as shown in FIG. 16A. Picture element information is thus obtained at those positions which are shown by broken lines in FIG. 16B. Namely, since color signals are obtained from almost all areas in the horizontal direction, color moire can be reduced.

What is claimed is:

1. An apparatus for picking up incoming light radiation representing image information, said apparatus comprising:
   (a) solid-state image sensor means for generating signal charges representing a plurality of color field images constituting one color frame image in response to the light radiation, said image sensor means comprising:
      (i) a sensing section for receiving the light radiation to generate and store charges which correspond to the light radiation, said sensing section including at least one linear cell array having a number of cells disposed in a horizontal direction at a predetermined pitch, and
      (ii) a transferring section arranged adjacent to said at least one linear cell array and extending along said at least one linear cell array to transfer and read out the charges stored in said sensing section;
   (b) a color filter member attached to said sensing section, said light radiation being introduced onto said sensing section through said color filter member;
   (c) swing-driver means coupled to said image sensor means for mechanically driving said image sensor means in at least said horizontal direction such that each cell of said at least one linear cell array shifts, during a frame period including first and second field periods, between different sampling positions substantially aligned in said horizontal direction, such that each cell of said at least one linear cell array is sequentially positioned at first and second sampling positions in the first field period, and is sequentially positioned at third and fourth sampling positions in the second field period; and
   (d) color image signal generating means connected to said image sensor means for generating brightness signal components and color signal components from said signal charges representing said plurality of color field images constituting said one color frame image such that said brightness signal components are produced at one of the first and second sampling positions and at one of the third and fourth sampling positions, thereby causing the color frame image to have a number of picture elements which is larger than the number of cells in said sensing section, thereby improving the horizontal image resolution of the color frame image, and such that said color signal components are produced at the first to fourth sampling positions, thereby minimizing the generation of color moire in the color frame image.

2. An apparatus according to claim 1, wherein said one of the first and second sampling positions and said one of the third and fourth sampling positions at which the brightness signal components are produced are spaced apart from each other by a distance equal to half of said predetermined pitch.

3. An apparatus according to claim 1, wherein the brightness signal components are produced at the second and third sampling positions, and wherein said second and third sampling positions are spaced apart from each other by a first distance equal to half of said predetermined pitch, and said first and fourth sampling positions are spaced apart from each other by a second distance equal to three-halves of said predetermined pitch.

4. An apparatus according to claim 1, wherein the brightness signal components are produced at the second and fourth sampling positions, and wherein said second and third sampling positions are spaced apart from each other by a first distance equal to half of said predetermined pitch, and said first and third sampling positions are spaced apart from each other by a second distance equal to three-halves of said predetermined pitch.

5. An apparatus according to claim 3, wherein said swing-driver means comprises:
   drive signal generator means for producing an electrical drive signal having four voltage levels; and
   vibrator means coupled to said image sensor means for receiving the electrical drive signal to generate a periodical displacement having four positions corresponding to said first to fourth sampling positions, said displacement being applied to said image sensor means to cause said image sensor means to shift between said first to fourth sampling positions in said frame period.

6. An apparatus according to claim 4, wherein said swing-driver means comprises:
   voltage generator means for producing four different voltage levels;
   multiplexer means connected to said voltage generator means for producing an electrical drive signal having said four different voltage levels; and
   vibrator means coupled to said image sensor means for receiving the electrical drive signal to generate a periodical displacement having four positions corresponding to said first to fourth sampling positions, said displacement being applied to said image sensor means to cause said image sensor means to shift between said first to fourth sampling positions in said frame period.

* * * * *

UNITED STATES PATENT AND TRADEMARK OFFICE
CERTIFICATE OF CORRECTION

PATENT NO. : 4,998,164

DATED : March 5, 1991

INVENTOR(S) : Yukio Endo et al

It is certified that error appears in the above-identified patent and that said Letters Patent is hereby corrected as shown below:

On the title page, item [30]:
The Foreign Application Priority Data is incorrect, Should be, --Mar. 23, 1983 [JP] Japan.................58-48129--.

Signed and Sealed this

Seventeenth Day of November, 1992

Attest:

DOUGLAS B. COMER

*Attesting Officer*    Acting Commissioner of Patents and Trademarks